(12) United States Patent
Darwish et al.

(10) Patent No.: US 8,042,053 B2
(45) Date of Patent: Oct. 18, 2011

(54) METHOD FOR MAKING DIGITAL DOCUMENTS BROWSEABLE

(75) Inventors: Kareem Mohamed Darwish, Cairo (EG); Ahmed Morsy, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 456 days.

(21) Appl. No.: 11/903,716

(22) Filed: Sep. 24, 2007

(65) Prior Publication Data

US 2009/0083677 A1    Mar. 26, 2009

(51) Int. Cl.
G06F 3/00    (2006.01)
G06F 9/00    (2006.01)
G06F 17/00   (2006.01)

(52) U.S. Cl. ........ 715/762; 715/763; 715/744; 715/747; 707/E17.008

(58) Field of Classification Search ......... 715/760, 715/762, 763, 776, 209, 864, 865, 769, 764, 715/744, 747; 707/E17.008
See application file for complete search history.

(56) References Cited

U.S. PATENT DOCUMENTS

| | | | |
|---|---|---|---|
| 5,634,064 A * | 5/1997 | Warnock et al. ............... 715/208 |
| 5,708,825 A | 1/1998 | Sotomayor |
| 5,905,991 A * | 5/1999 | Reynolds ....................... 715/234 |
| 5,907,836 A * | 5/1999 | Sumita et al. ................. 707/754 |
| 5,963,205 A | 10/1999 | Sotomayor |
| 6,035,303 A | 3/2000 | Baer et al. |
| 6,038,561 A * | 3/2000 | Snyder et al. ...................... 707/6 |
| 6,104,989 A | 8/2000 | Kanevsky et al. |
| 6,167,368 A | 12/2000 | Wacholder |
| 6,240,410 B1 | 5/2001 | Wical |
| 6,256,631 B1 | 7/2001 | Malcolm |
| 6,295,542 B1 | 9/2001 | Corbin |
| 6,298,344 B1 * | 10/2001 | Inaba et al. ........................ 707/5 |
| 6,353,831 B1 | 3/2002 | Gustman |
| 6,473,730 B1 * | 10/2002 | McKeown et al. ................. 704/9 |
| 6,562,077 B2 * | 5/2003 | Bobrow et al. ............... 715/204 |
| 6,907,562 B1 | 6/2005 | Schuetze |
| 6,978,420 B2 * | 12/2005 | Ching ........................... 715/229 |
| 7,010,742 B1 | 3/2006 | Hsu et al. |
| 7,096,214 B1 * | 8/2006 | Bharat et al. .................. 707/708 |
| 7,136,819 B2 | 11/2006 | Whitham |
| 7,228,437 B2 | 6/2007 | Spagna et al. |
| 2002/0111968 A1 * | 8/2002 | Ching ........................... 707/514 |
| 2002/0178153 A1 * | 11/2002 | Nishioka et al. .................. 707/3 |
| 2004/0030719 A1 | 2/2004 | Wei |
| 2005/0038814 A1 | 2/2005 | Iyengar et al. |
| 2005/0091591 A1 * | 4/2005 | Boguraev et al. ............. 715/526 |
| 2005/0102610 A1 | 5/2005 | Jie |
| 2005/0149576 A1 * | 7/2005 | Marmaros et al. ............ 707/200 |

(Continued)

OTHER PUBLICATIONS

Shi, S. et al.; "Pseudo-Anchor Text Extraction for Vertical Search"; Microsoft Technical Report; http://research.microsoft.com/research/pubs/view.aspx?tr_id=1168; Aug. 2006.

(Continued)

*Primary Examiner* — Kieu Vu
*Assistant Examiner* — Anita D Chaudhuri (57) ABSTRACT

A method for making one or more digital documents browseable. In one implementation, the digital documents may be automatically, topically segmented into one or more topical segments. A topical segment may be selected from the topical segments. One or more topical segments that are substantially similar to the selected topical segment may be identified. One or more links between the selected topical segment and the identified topical segment may be established. The established links may be displayed.

12 Claims, 4 Drawing Sheets

U.S. PATENT DOCUMENTS

| | | | |
|---|---|---|---|
| 2006/0195461 | A1 | 8/2006 | Lo et al. |
| 2006/0206476 | A1* | 9/2006 | Kapur et al. ............... 707/5 |
| 2007/0156654 | A1* | 7/2007 | Ravinarayanan ............ 707/3 |
| 2007/0168413 | A1 | 7/2007 | Barletta et al. |
| 2007/0233692 | A1* | 10/2007 | Lisa et al. ................. 707/10 |
| 2007/0266022 | A1* | 11/2007 | Frumkin et al. ............. 707/5 |

OTHER PUBLICATIONS

Arai, et al., "PaperLink: A Technique for Hyperlinking from Real Paper to Electronic Content", Proceedings of the SIGCHI conference on Human factors in computing systems, Date: 1997, pp. 327-334, ACM Press, New York, USA.

Chien Lee-Feng, "PAT-Tree-Based Keyword Extraction for Chinese Information' Retrieval Considering the Information Retrieval", Proceedings of the 20th annual international ACM SIGIR conference on Research and development in information retrieval, Date: 1997, Page: pp. 50-58, ACM Press, New York, USA.

He, et al., "Web Document Clustering Using Hyperlink Structures", pp. 1-22.

Smith, et al., "An Extensible Object Tracking Architecture for Hyperlinking in Real-time and Stored Video Streams", pp. 1-11, Date: Apr. 24, 2002, ACM Press, New York, USA.

* cited by examiner

METHOD FOR MAKING DIGITAL DOCUMENTS BROWSEABLE

BACKGROUND

There is an increasing volume of digital documentation, such as digital books, digital documents in corporations and the like. The increased volume demands user models that can effectively enable users to search and utilize the digital documentation. Current models involve searching of content, sequential browsing and random access browsing via the table of contents or word index type structures. These models provide a starting point for user access to the digital documents.

A typical digital documentation user model might allow a user to ask for content from one or more digital documents meeting specific criteria, such as a given word or phrase, and retrieve a list of items that match those criteria. The list may be sorted with respect to some measure of relevance of the results. The user is then left to examine the listed items and do additional searches for new words or phrases of interest.

SUMMARY

Described herein are implementations of various techniques for a method for making one or more digital documents browseable. In one implementation, digital documents may be automatically, topically segmented into one or more topical segments. Alternatively, the digital documents may be pre-segmented or provided in units. A topical segment may be selected from the topical segments. One or more topical segments that are substantially similar to the selected topical segment may be identified by comparing the selected topical segment to the topical segments for similarity using one or more similarity algorithms, ranking the compared topical segments by similarity and identifying ranked topical segments with a similarity above a specified similarity threshold. One or more links between the selected topical segment and the identified topical segments may be established and displayed.

In another implementation, one or more key concepts and one or more key phrases may be extracted from each topical segment. A key phrase may be selected. One or more topical segments having key concepts that are substantially similar to the selected key phrase may be identified by comparing the selected key phrase to the key concepts for similarity using one or more similarity algorithms, ranking the compared key concepts by similarity and identifying topical segments having ranked key concepts with a similarity above a specified similarity threshold. One or more links between the selected key phrase and the identified topical segments having key concepts that are substantially similar to the selected key phrase may be established and displayed.

In yet another implementation, one or more table of contents for one or more digital documents may be segmented into one or more entries. An entry may then be selected. One or more entries that are substantially similar to the selected entry may be identified. One or more links between the selected entry and the identified entries that are substantially similar to the selected entry may be established and displayed.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, one or more implementations described herein are directed to various techniques for linking digital documents to provide a browsing experience for digital documents. Digital documents may be defined as documents that were created digitally or have been converted into a digital format. For example, digital documents may include memos, papers, books, and the like that were created in a computer environment or were scanned into a computer using Optical Character Recognition (OCR). Digital documents may also include audio or video files that are in digital format. Digital documents may also be mostly flat digital documents, which are documents that were not mainly created for the purpose of hyperlinked browsing such as digital books and enterprise documents.

In one implementation, the digital documents may be automatically topically segmented. One or more key concepts and one or more key phrases may then be extracted from each topical segment. A topical segment may be selected and other topical segments may be compared to the selected topical segment for similarity. The compared topical segments may be ranked. Links may be established between the selected topical segment and the compared topical segments. This may be repeated for each topical segment. A key phrase may be selected and key concepts may be compared to the selected key phrase for similarity. The compared key concepts may be ranked. Links may be established between the selected key phrase and the topical segments associated with the compared key concepts. This may be repeated for each key phrase. The established links may then be displayed. One or more techniques for linking digital documents for browsing in accordance with various implementations are described in more detail with reference to FIGS. 1-3 in the following paragraphs In addition, one or more implementations described herein are directed to various techniques for linking table of contents for one or more digital documents to provide a browsing experience for table of contents for digital documents. Each table of contents may be automatically segmented into entries. A table of contents entry may be selected and other table of contents entries may be compared to the selected table of contents entry for similarity. The similarity comparison may be based on lexical similarity of the text of the entries or the text to which the entries point or other non-lexical features. The compared table of contents entries may be ranked. Links may be established between the selected table of contents entry and the compared table of contents entries. This may be repeated for each table of contents entry. The established links may then be displayed. One or more techniques for linking table of contents for one or more digital documents for browsing in accordance with various implementations are described in more detail with reference to FIG. 4 in the following paragraphs.

Implementations of various techniques described herein may be operational with numerous general purpose or special purpose computing system environments or configurations. Examples of well known computing systems, environments, and/or configurations that may be suitable for use with the various techniques described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various techniques described herein may be implemented in the general context of computer-executable instructions, such as program modules, being executed by a computer. Generally, program modules include routines, programs, objects, components, data structures, etc. that perform particular tasks or implement particular abstract data types. The various techniques described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
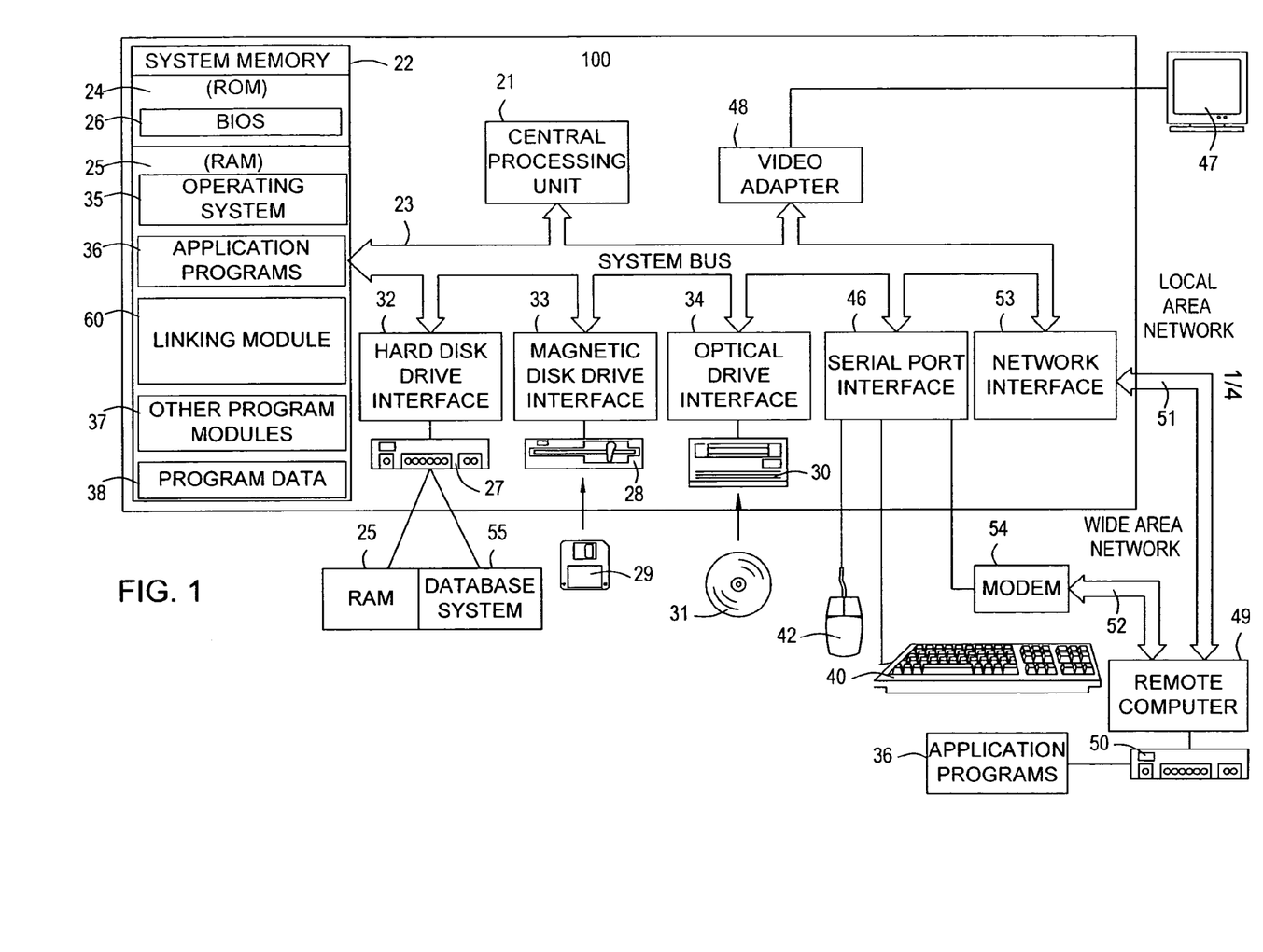
FIG. 1 illustrates a schematic diagram of a computing system in which the various techniques described herein may be incorporated and practiced.

FIG. 1 illustrates a schematic diagram of a computing system 100 in which the various techniques described herein may be incorporated and practiced. Although the computing system 100 may be a conventional desktop or a server computer, as described above, other computer system configurations may be used.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk, magnetic disk 29, optical disk 31, ROM 24 or RAM 25, including an operating system 35, one or more application programs 36, a linking module 60, program data 38 and a database system 55. The operating system 35 may be any suitable operating system that may control the operation of a networked personal or server computer, such as Windows® XP, Mac OS® X, Unix-variants (e.g., Linux® and BSD®), and the like. The linking module 60 will be described in more detail with reference to FIGS. 2-4 in the paragraphs below.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices, such as speakers and printers.

Further, the computing system 100 may operate in a networked environment using logical connections to one or more remote computers, such as a remote computer 49. The remote computer 49 may be another personal computer, a server, a router, a network PC, a peer device or other common network node. Although the remote computer 49 is illustrated as having only a memory storage device 50, the remote computer 49 may include many or all of the elements described above relative to the computing system 100. The logical connections may be any connection that is commonplace in offices, enterprise-wide computer networks, intranets, and the Internet, such as local area network (LAN) 51 and a wide area network (WAN) 52.

When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. It will be appreciated that the network connections shown are exemplary and other means of establishing a communications link between the computers may be used.

It should be understood that the various techniques described herein may be implemented in connection with hardware, software or a combination of both. Thus, various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
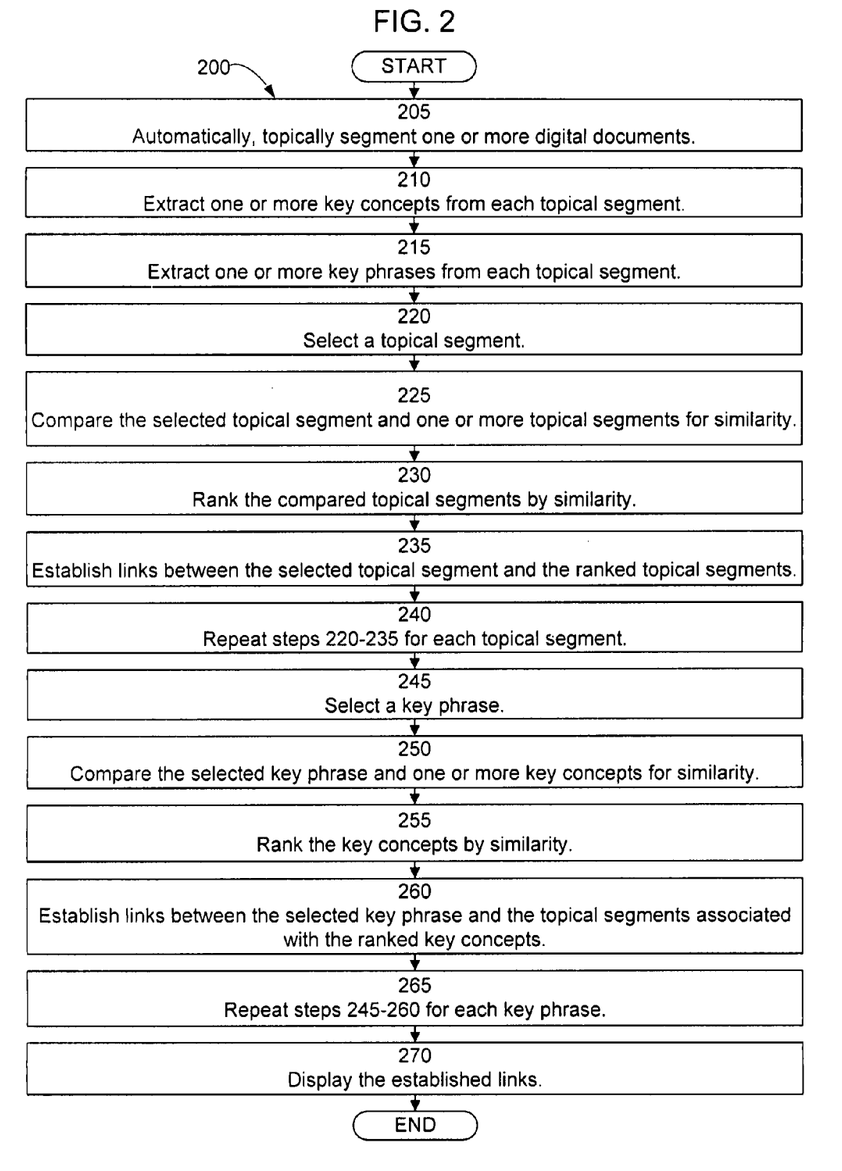
FIG. 2 illustrates a flow diagram of a method for linking digital documents to provide a browsing experience to digital documents in accordance with implementations of various techniques described herein.

FIG. 2 illustrates a flow diagram of a method 200 for linking digital documents to provide a browsing experience for digital documents in accordance with implementations of various techniques described herein. It should be understood that while the flow diagram indicates a particular order of execution of the operations, in other implementations, the operations might be executed in a different order.

At step 205, one or more digital documents may be automatically, topically segmented. Topical segmentation may be dividing the digital documents into sections based on topic rather than by page or paragraph. A segment may contain one or more paragraphs or pages. Segmentation may be performed automatically using various methods including Text Tiling, lexical chaining and the like. For example, Text Tiling may assume that the content shifts from one topical segment to the next. The content may typically be represented using the tokens in a segment. A dramatic change in the distribution of tokens or their equivalents, such as synonyms or co-occurring tokens, may signify a topical shift. Other features that can further enhance Text Tiling include the use of cue-words that may indicate a topical shift or other techniques such as lexical chaining.

Figure 3:
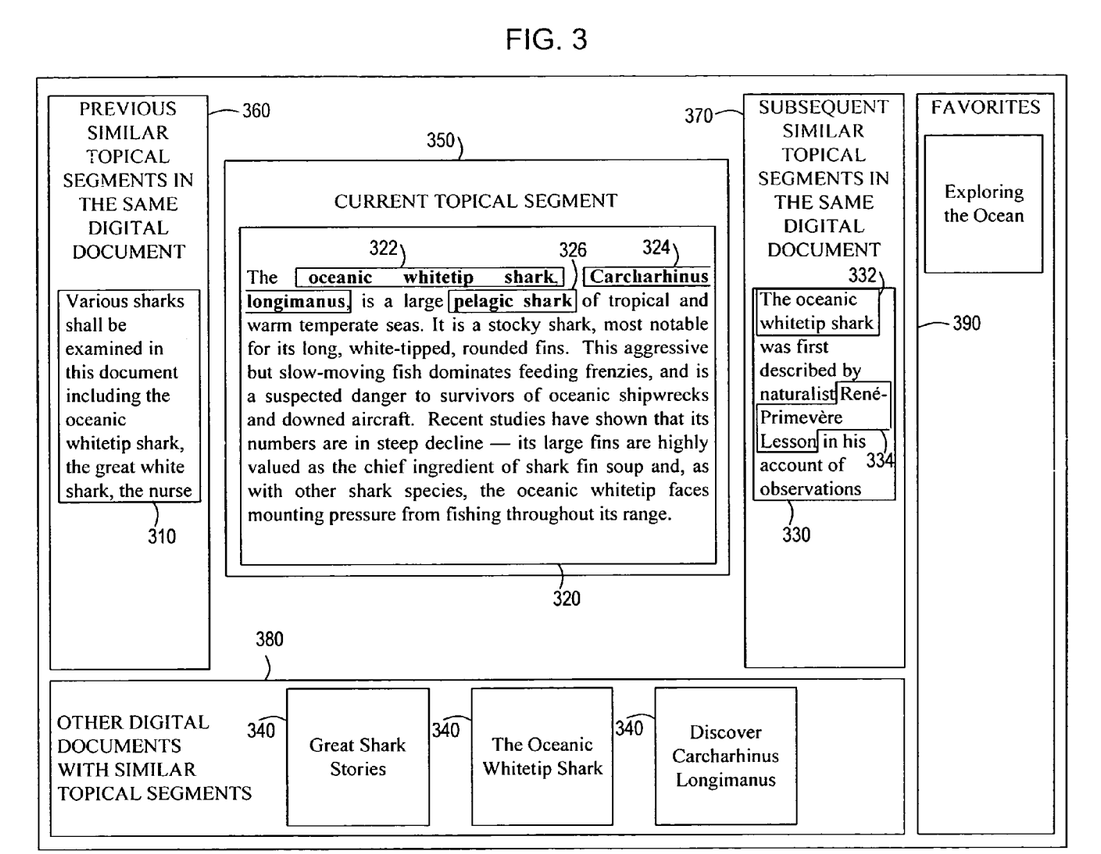
FIG. 3 illustrates an example of how a digital document, such as a digital book about sharks, may be linked to provide a browsing experience in accordance with implementations of various techniques described herein.

FIG. 3 illustrates an example of how a digital document, such as a digital book about sharks, may be linked to provide a browsing experience in accordance with implementations of various techniques described herein. For example, the digital book about sharks may be topically segmented such that a first topical segment 310 may give an overview of sharks covered in the book, a second topical segment 320 define a particular species of shark, a third topical segment 330 may describe the selected particular species of shark and further topical segments may discuss other species of sharks.

At step 210, one or more key concepts may be automatically extracted from each topical segment. A key concept may capture the main idea or topic of a segment. Key concepts may be extracted automatically using various key concept extraction methods known in the art. For example, key concepts from a predefined list may be mapped to text using unsupervised or supervised learning. In another approach, a key concept may be extracted by selecting a sequence of words from the text that best describe the content, typically using supervised learning. Continuing with the above example in FIG. 3, a key concept for the first topical segment 310 may be "various sharks examined in this document." A key concept for the second topical segment 320 may be "defining the oceanic whitetip shark." A key concept for the third topical segment 330 may be "a description of the oceanic whitetip shark."

At step 215, one or more key phrases may be extracted from each topical segment. Key phrases may include various terms or ideas in a topical segment. Key phrases may be subtopics or references within the topical segment. One or more key phrases may be automatically extracted using various key phrase extraction methods known in the art. For example, key phrase extraction may be accomplished by approaches that use phrase occurrence counts, part of speech patterns and word collocations. In another approach, key phrase extraction may be accomplished based on supervised learning in which a classifier is trained on features such as phrase location in a text segment, a phrase term frequency and document frequency. Continuing with the above example in FIG. 3, key phrases in the second topical segment 320 may include "oceanic whitetip shark" 322, "carcharhinus longimanus" 324, "pelagic shark" 326 and the like. Key phrases in the third topical segment 330 may include "oceanic whitetip shark" 332 and "Rene-Primevere Lesson" 334.

At step 220, a topical segment may be selected. Continuing with the above example in FIG. 3, the second topical segment 320 may be selected.

At step 225, the selected topical segment 320 and one or more compared topical segments may be automatically compared for similarity. The compared topical segments may be one or more topical segments within the same digital document and in other digital documents. Continuing with the above example in FIG. 3, the selected topical segment 320 and topical segment 310, topical segment 330 and any number of other topical segments in the same or other digital documents may be compared for similarity. The selected topical segment 320 and each compared topical segment may be compared for similarity by applying similarity algorithms. The similarity algorithm applied may be content and word-sequence based similarity, such as cosine similarity, okapi similarity, relevance language models, latent semantic indexing, variations that use semantic similarity and the like. For example, a vector space model and a probabilistic model may be used to compute the similarity between two text segments. Both of these models compute the similarity between two pieces of text within the context of other pieces of text and use document frequency, term frequency, and text segment length. Document frequency may be defined as the number of text segments in which a token appears. Term frequency may be defined as the number of times a token is mentioned in a text segment. The vector space model represents each text segment as a vector of features, where the features are the tokens that makeup the segment, and computes the angle between the two vectors using the dot product between the vectors. The probabilistic model as implemented using the OKAPI-BM25 weighting formula is proportional to term frequency and inversely proportional to document frequency and text segment length. The OKAPI-BM25 formula uses tuning parameters to control the effect term and document frequency and segment length. Other methods for computing similarity may not require the computation of similarity between two pieces of text within the context of other pieces of text; hence they may not use document and term frequencies. Some methods for computing similarity may use paraphrase detection. The similarity algorithm may generate a similarity score for each compared topical segment in relation to the selected topical segment.

At step 230, the compared topical segments may be ranked. The similarity score may be used to rank the compared topical segments. Highly similar topical segments may be ranked first while less similar topical segments may be ranked later. All compared topical segments may be ranked. Alternatively, a threshold similarity score may be established and only compared topical segments with similarity rankings equal to or above the threshold similarity score may be ranked. In this manner, in steps 225 to 230, one or more topical segments that are substantially similar to the selected topical segment may be identified.

Continuing with the above example in FIG. 3, the second topical segment 320 defining a particular species of shark may be found to be substantially similar to the first topical segment 310 giving an overview of the sharks covered in the book and the third topical segment 330 describing the particular species of shark. Therefore, in relation to the second topical segment 320, the first topical segment 310 and the third topical segment 330 may each have a high similarity ranking. In addition, the second topical segment 320 may be found to be substantially similar to topical segments in other digital documents 340 giving these topical segment high similarity rankings.

At step 235, links may be established between the selected topical segment 320 and the ranked topical segments. A link may be defined as a navigation element in a digital document, such that when the navigation element is selected by a user, information from another segment of the same digital document or a specified segment of another digital document may be automatically displayed to the user. The links may be established by methods known in the art. The links may be unidirectional or bidirectional. The links may be hyperlinks, inter-links, cross-links and the like.

At step 240, steps 220 to 235 may be repeated for each topical segment. In this manner, each topical segment may be linked to substantially similar topical segments.

At step 245, a key phrase may be selected. Continuing with the above example in FIG. 3, the key phrase, "oceanic whitetip shark" 322, may be selected.

At step 250, the selected key phrase 322 and one or more compared key concepts may be automatically compared for similarity. The compared key concepts may be one or more key concepts extracted from the same digital document and other digital documents. Continuing with the above example in FIG. 3, the selected key phrase 322 and the key concept for the first topical segment 310, "various sharks examined in this document," the key concept for the third topical segment 330, "a description of the oceanic whitetip shark," and any number of other key concepts for topical segments in the same or other digital documents may be compared for similarity. The selected key phrase 322 and each key concept may be compared for similarity by applying similarity algorithms. The similarity algorithm applied may be content and word-sequence based similarity, such as cosine similarity, okapi similarity, relevance language models, latent semantic indexing, variations that use semantic similarity and the like. The similarity algorithm applied may also be string similarity, such as q-grams, edit-distance, and the like. The similarity algorithm may generate a similarity score for each compared key concept and the topical segment in which the key concept is found. It should be noted that each compared key concept is associated with a topical segment. The similarity between the selected key phrase and a compared key concept may be an indication of the similarity between the selected key phrase and the topical segment associated with the compared key concept. At step 260 below, the selected key phrase may be linked to topical segments with substantially similar key concepts such that a user desiring more information on a key phrase may browse to topical segments related to the key phrase.

At step 255, the compared key concepts and their associated topical segments may be ranked. The similarity score may be used to rank the compared key concepts and their associated topical segments. Highly similar key concepts may be ranked first while less similar key concepts may be ranked later. All compared key concepts may be ranked. Alternatively, a threshold similarity score may be established and only key concepts with similarity rankings equal to or above the threshold similarity score may be ranked. In this manner, in steps 250 to 255, one or more topical segments having key concepts that are substantially similar to the selected key phrase may be identified.

Continuing with the above example in FIG. 3, the key phrase, "oceanic whitetip shark" 322, may be found to be substantially similar to a key concept in the third topical segment 330, "a description of the oceanic whitetip shark." Therefore, in relation to the key phrase, "oceanic whitetip shark" 322, the third topical segment 330 may have a high similarity ranking. In addition, key phrase, "oceanic whitetip shark" 322, may be found to be substantially similar to key concepts in topical segments in other digital documents 340 giving these topical segments high similarity rankings.

At step 260, links may be established between the selected key phrase 322 and the topical segments associated with the ranked key concepts. The links may be established by methods known in the art. The links may be unidirectional or bidirectional. The links may be hyperlinks, inter-links, cross-links and the like.

At step 265, steps 245 to 260 may be repeated for each key phrase. In this manner, each key phrase may be linked to topical segments with substantially similar key concepts.

At step 270, the established links may be displayed. The established links may be displayed according to ranking. The established links may be displayed in various manners. In one implementation, the established links may be displayed as illustrated in FIG. 3. When a topical segment is currently being viewed by a user, it will appear in the "CURRENT TOPICAL SEGMENT" box 350. Links to substantially similar topical segments from within the same digital document may be displayed in the "PREVIOUS SIMILAR TOPICAL SEGMENTS IN THE SAME DIGITAL DOCUMENT" box 360, if they precede the current topical segment in the digital document, and in the "SUBSEQUENT SIMILAR TOPICAL SEGMENTS IN THE SAME DIGITAL DOCUMENT" box 370, if they come after the current topical segment in the digital document. Links to other digital documents containing substantially similar topical segments may be displayed in the "OTHER DIGITAL DOCUMENTS WITH SIMILAR TOPICAL SEGMENTS" box 380. A user may identify certain links as favorites and these links may be displayed in the "FAVORITES" box 390.

Figure 4:
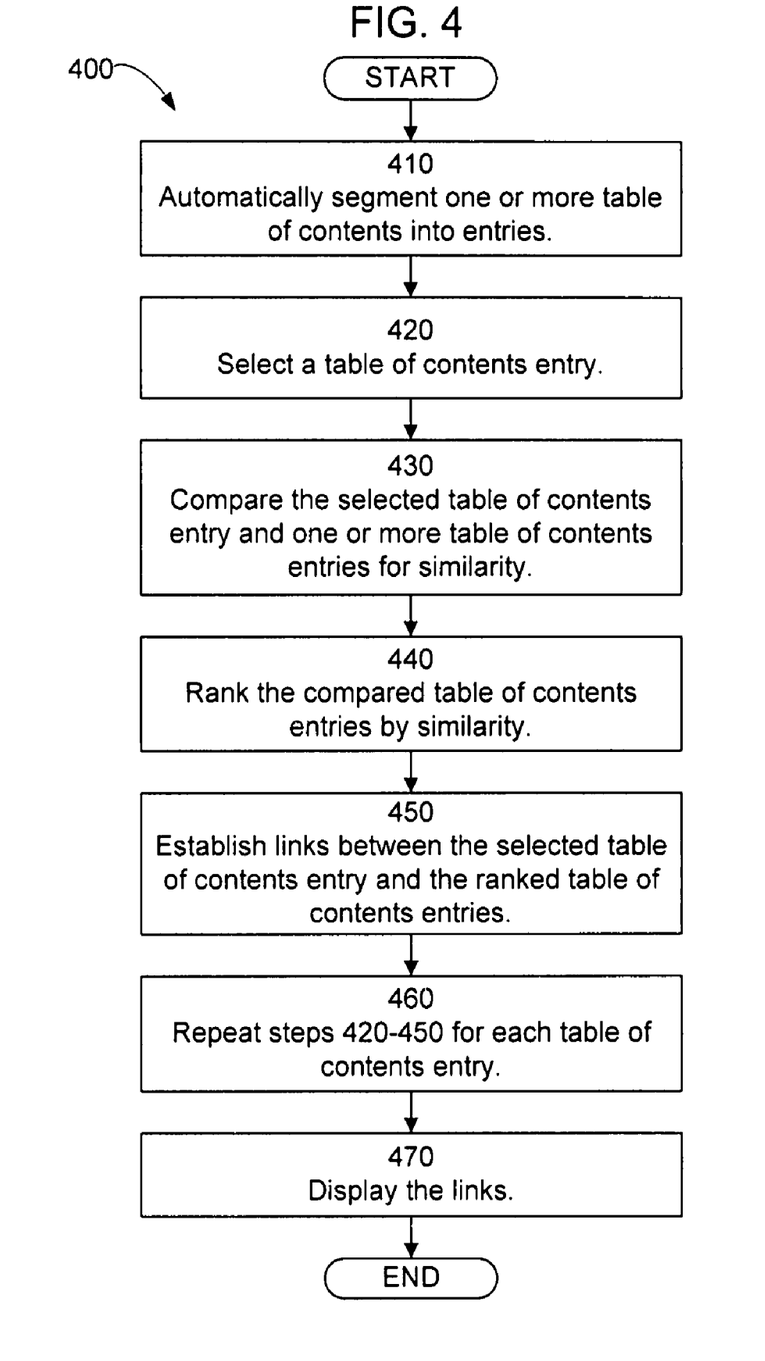
FIG. 4 illustrates a flow diagram of a method for linking the table of contents for one or more digital documents to provide a browsing experience to table of contents for digital documents in accordance with implementations of various techniques described herein.

FIG. 4 illustrates a flow diagram of a method 400 for linking the table of contents for one or more digital documents to provide a browsing experience to table of contents for digital documents in accordance with implementations of various techniques described herein. It should be understood that while the flow diagram indicates a particular order of execution of the operations, in other implementations, the operations might be executed in a different order.

At step 410, the table of contents for one or more digital documents may be automatically segmented into entries. Segmentation may be performed automatically using various methods including applying heuristics on visual cues or OCR output, applying a statistical technique such as a classifier trained on the features of entries, a combination of heuristics and statistics and the like.

At step 420, a table of contents entry may be selected.

At step 430, the selected table of contents entry and compared table of contents entries may be automatically compared for similarity. The compared table of contents entries may be one or more table of contents entries within the same table of contents and in table of contents in other digital documents. The selected table of contents entry and each compared table of contents entry may be compared for similarity by applying similarity algorithms. Alternatively, the text referenced by the selected table of contents entry and the text referenced by each compared table of contents entries may be compared for similarity. The similarity algorithm applied may be content and word-sequence based similarity, such as cosine similarity, okapi similarity, relevance language models, latent semantic indexing, variations that use semantic similarity and the like. Or, the similarity algorithm applied may be string similarity, such as q-grams, edit-distance, and the like. The similarity algorithm may generate a similarity score for each compared table of contents entry.

At step 440, the compared table of contents entries may be ranked. The similarity score may be used to rank the compared table of contents entries. Highly similar table of contents entries may be ranked first while less similar table of contents entries may be ranked later. All compared table of contents entries may be ranked. Alternatively, a threshold similarity score may be established and only compared table of contents entries with similarity rankings equal to or above the threshold similarity score may be ranked. In this manner, in steps 430 to 440, one or more table of contents entries that are substantially similar to the selected table of contents entry may be identified.

At step 450, links may be established between the selected table of contents entry and the ranked table of contents entries. The links may be established by methods known in the art. The links may be unidirectional or bidirectional. The links may be hyperlinks, inter-links, cross-links and the like.

At step 460, steps 420 to 450 may be repeated for each table of contents entry. In this manner, each table of contents entry may be linked to substantially similar table of contents entries.

At step 470, the established links may be displayed. The established links may be displayed according to ranking and in various manners.

It should be noted that the method 200 for linking digital documents to provide a browsing experience to digital documents and the method 400 for linking the table of contents for one or more digital documents to provide a browsing experience to table of contents for digital documents may be implemented by a linking module 60. Also, the method 200 for linking digital documents to provide a browsing experience to digital documents and the method 400 for linking the table of contents for one or more digital documents to provide a browsing experience to table of contents for digital documents may be implemented together such that the table of contents as well as the text of one or more digital documents may be linked to provide a browsing experience in accordance with implementations of various techniques described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
   a processor; and
   a memory comprising program instructions executable by the processor to:
     topically segment digital documents into topical segments;
     extract key concepts from the topical segments;
     extract key phrases from the topical segments;
     select a first one of the key phrases that is included in a first one of the digital documents;
     compare the first key phrase with the key concepts for similarities;
     rank the compared key concepts by the similarities;
     identify, from the topical segments, those topical segments in the first digital document and a second one of the digital documents that have ranked key concepts with individual similarities above a specified similarity threshold;
     establish navigation links between the first key phrase in the first digital document and the identified topical segments in the first digital document and the second digital document to enable a user to navigate within the first digital document or from the first digital document to the second digital document; and
     concurrently display at least:
       a currently viewed topical segment in the first digital document,
       first individual navigation links to a previous identified topical segment in the first digital document and a subsequent identified topical segment in the first digital document, and
       a second individual navigation link to an identified topical segment in the second digital document.

2. The computer system of claim 1, wherein the digital documents are digital books.

3. The computer system of claim 1, wherein the digital documents are mostly flat digital documents.

4. The computer system of claim 1, wherein the similarities are determined by one or more similarity algorithms.

5. A method comprising:
   topically segmenting digital documents into topical segments;
   extracting key concepts from the topical segments;
   extracting key phrases from the topical segments;

selecting a first one of the key phrases that is included in a first one of the digital documents;

comparing the first key phrase with the key concepts for similarities;

ranking the compared key concepts by the similarities;

identifying, from the topical segments, those topical segments in the first digital document and a second one of the digital documents that have ranked key concepts with individual similarities above a specified similarity threshold;

establishing navigation links between the first key phrase in the first digital document and the identified topical segments in the first digital document and the second digital document to enable a user to navigate within the first digital document or from the first digital document to the second digital document; and concurrently displaying at least:
- a currently viewed topical segment in the first digital document,
- first individual navigation links to a previous identified topical segment in the first digital document and a subsequent identified topical segment in the first digital document, and
- a second individual navigation link to an identified topical segment in the second digital document.

6. The method of claim 5, wherein the digital documents are digital books.

7. The method of claim 5, wherein the digital documents are mostly flat digital documents.

8. The method of claim 5, wherein the similarities are determined by one or more similarity algorithms.

9. One or more computer-readable storage devices comprising computer-executable instructions which, when executed by one or more processors, cause the one or more processors to perform:

topically segmenting digital documents into topical segments;

extracting key concepts from the topical segments;

extracting key phrases from the topical segments;

selecting a first one of the key phrases that is included in a first one of the digital documents;

comparing the first key phrase with the key concepts for similarities;

ranking the compared key concepts by the similarities;

identifying, from the topical segments, those topical segments in the first digital document and a second one of the digital documents that have ranked key concepts with individual similarities above a specified similarity threshold;

establishing navigation links between the first key phrase in the first digital document and the identified topical segments in the first digital document and the second digital document to enable a user to navigate within the first digital document or from the first digital document to the second digital document; and concurrently displaying at least:
- a currently viewed topical segment in the first digital document,
- first individual navigation links to a previous identified topical segment in the first digital document and a subsequent identified topical segment in the first digital document, and
- a second individual navigation link to an identified topical segment in the second digital document.

10. The one or more computer-readable storage devices of claim 9, wherein the digital documents are digital books.

11. The one or more computer-readable storage devices of claim 9, wherein the digital documents are mostly flat digital documents.

12. The one or more computer-readable storage devices of claim 9, wherein the similarities are determined by one or more similarity algorithms.

* * * * *